N. AMES.
Weed-Puller Hoe.

No. 43,869 Patented Aug 16, 1864.

Witnesses.
Joseph Ames
H. F. Badger

Inventor:
Nathan Ames

UNITED STATES PATENT OFFICE.

NATHAN AMES, OF SAUGUS CENTRE, MASSACHUSETTS.

WEED-PULLER HOE.

Specification forming part of Letters Patent No. 43,869, dated August 16, 1864.

*To all whom it may concern:*

Be it known that I, NATHAN AMES, of Saugus Centre, in the county of Essex and State of Massachusetts, have invented a new and useful Weed-Puller Hoe; and I do hereby declare that the following is a full, clear, and exact description of the construction and operation of the same, reference being had to the accompanying drawings, forming a part of this specification, in which—

Figure 2:
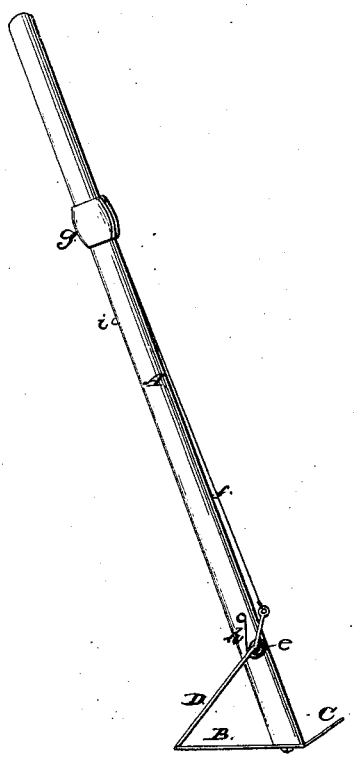
Figure 1:
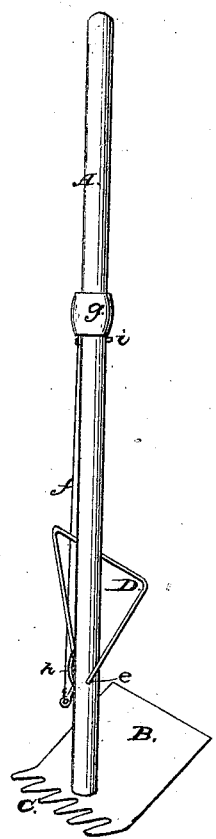

Figure 1 is a perspective view of a combined hoe and garden-rake with the weed-puller or nipper D open, and Fig. 2 is a side view of the same with the nipper D closed down upon the edge of the hoe as in the act of grasping a weed or other article to be pulled or lifted.

Like parts are indicated by the same letters in both figures.

The nature of my invention consists in combining a grasping-hand or nipper with a hoe, garden-rake, scuffle, or other analogous instrument for hoeing, digging, or raking the soil, so that the operator may use said hand or nipper for pulling or lifting weeds, vegetables, &c., without stooping or bending the back, thereby saving a great deal of painful labor, as well as the soiling and roughening of the hands.

To enable others skilled in the art to make and use my invention, I will now describe its construction and operation.

In the drawings, B and C represent a common combination hoe and garden-rake provided with the usual handle, A.

D is the grasping-hand or nipper pivoted at $e$ to the handle A. This nipper may be constructed of any suitable metal or material, and in various ways. It may be a rod of steel or iron, bent as represented in the drawings, or a plate of sheet metal or cast-iron. That part of the nipper which strikes upon the hoe should be as wide as the edge of the latter and flush with the same when the two are brought together, as shown in Fig. 2. A simple wire bent as represented in the drawings, will answer for pulling weeds and many other purposes; but for lifting or picking up vegetables—such as potatoes, turnips, onions, &c.—as well as little stones it will be better to construct the point of the nipper broader and a little concave on the side next to the hoe.

$h$ is a spiral spring attached to the handle A and nipper D, by means of which the latter is thrown up and held in the position represented in Fig. 1.

$f$ is a small cord, wire, chain, or rod, of wood or metal, the lower end of which is attached to the short arm of the nipper, the upper end being attached to the freely-sliding thimble $g$.

$i$ is a pin, projecting a little from the handle A, to prevent the thimble $g$ from sliding down too far.

The nipping devices are so very light and simple that the hoe or rake may be used for all purposes precisely the same as though the said devices were not attached; but for pulling up weeds or plants and picking up roots, vegetables, and other articles from the ground without stooping, bending the back, or soiling and hurting the hands the nipper D will be found of great utility, not only for farmers in general, but also for amateur gardeners and ladies, who can thus avoid much of the most disagreeable and burdensome part of out-door work in field or garden. With one hand grasping the upper part of the handle A in the usual manner, whenever the operator wishes to pull up a weed or plant or pick up any small article from the ground he simply places the point of the hoe behind it and pulls the thimble $g$ with the other hand, which action will obviously bring the nipper D into the position represented in Fig. 2; and the more he pulls upon the thimble the tighter the article will be held between the nipper and hoe.

The drawings represent my weed-pulling device as applied to a combination hoe and garden-rake; but it may obviously be applied to either of them separately. It may also be applied to advantage in combination with a scuffle, spade, shovel, or other analogous implement for working the soil, in working which it is often necessary to stoop or bend in order to pull or pick up things from the ground.

Having thus described the construction and operation of my invention, what I claim as new, and desire to secure by Letters Patent, is—

1. The combination of the nipper D, or its equivalent, with a hoe or other analogous tool or tools, substantially as and for the purpose described.

2. Actuating the nipper by means of the cord $f$, or its equivalent, reaching up to the operator's hand, substantially as described.

NATHAN AMES.

Witnesses:
 JOSEPH AMES,
 A. F. BADGER.